May 23, 1961 W. A. HUBBARD 2,985,570
RAPID ION EXTRACTION MERCURY CELL
Filed Sept. 4, 1956 5 Sheets-Sheet 1
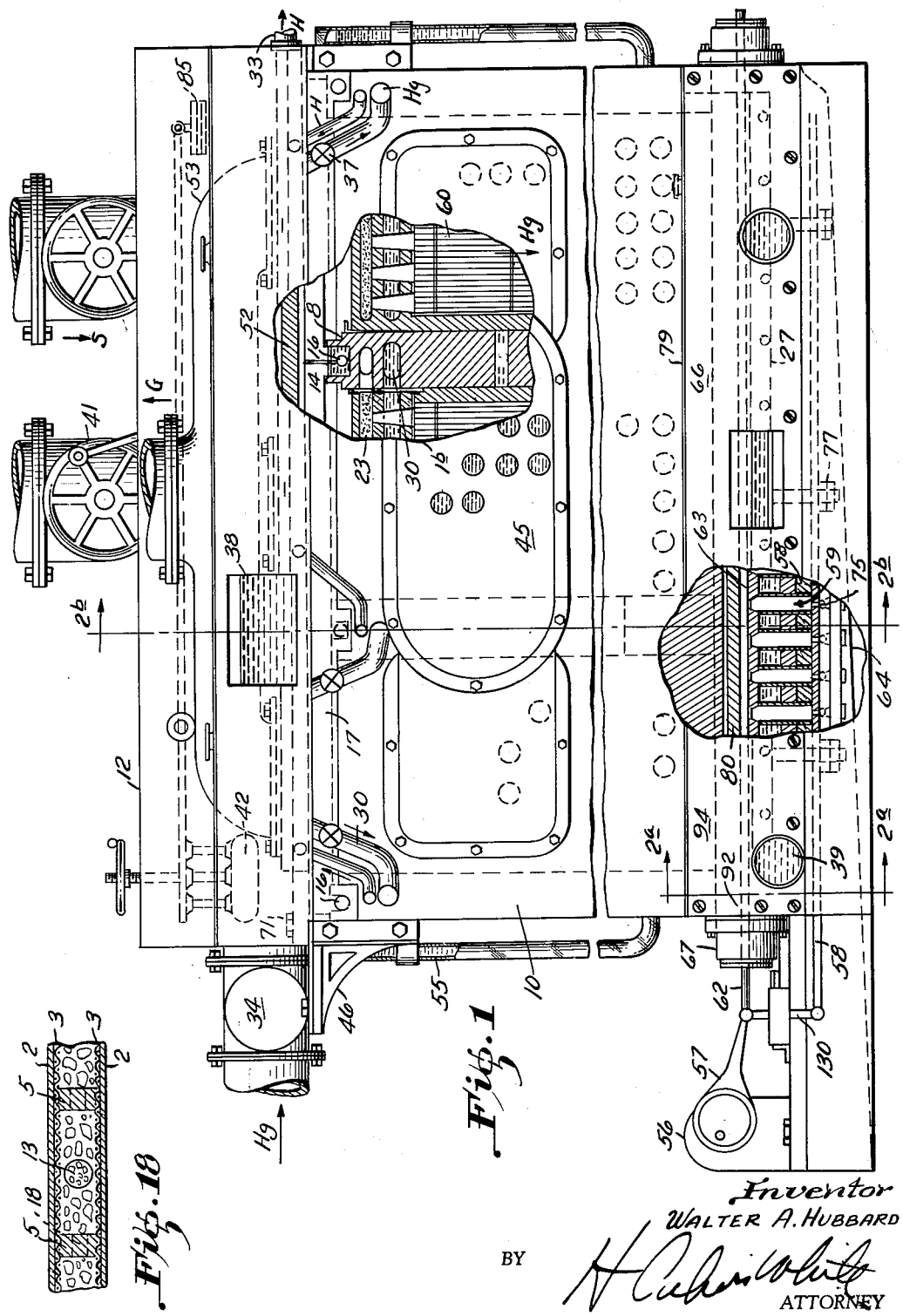
Inventor
WALTER A. HUBBARD
BY
ATTORNEY

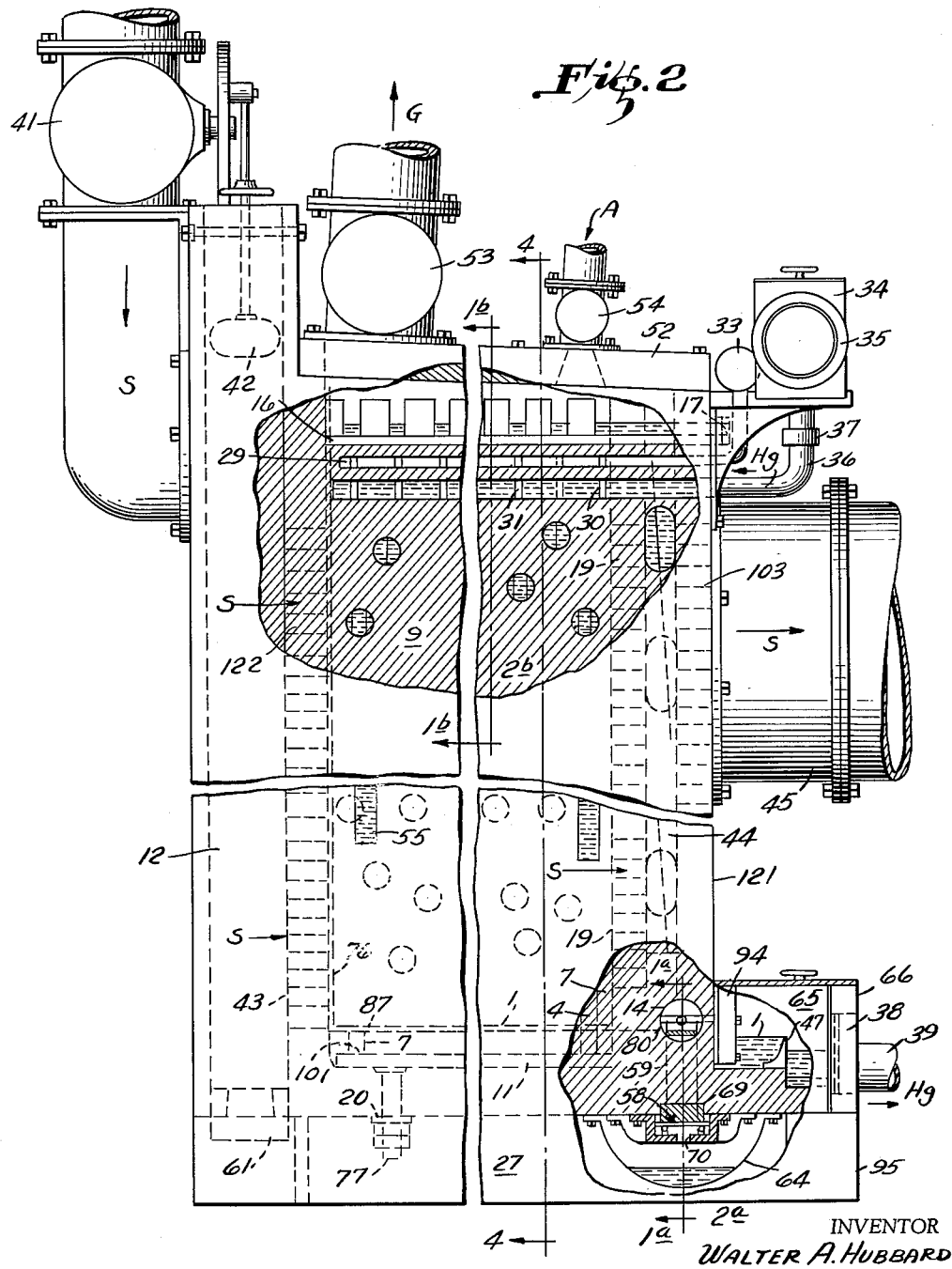

May 23, 1961 W. A. HUBBARD 2,985,570
RAPID ION EXTRACTION MERCURY CELL
Filed Sept. 4, 1956 5 Sheets-Sheet 3
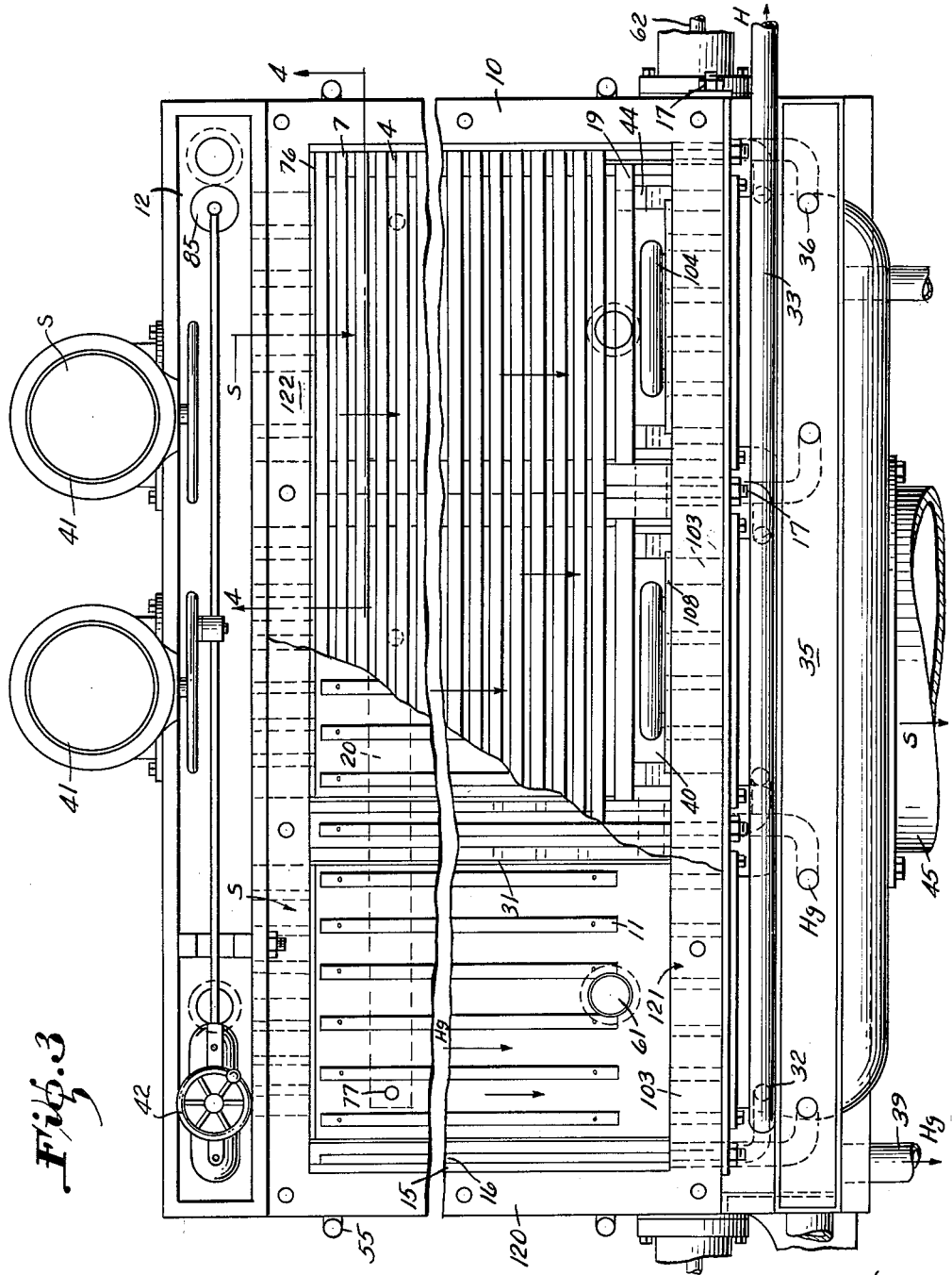
Inventor
WALTER A. HUBBARD
BY H Calvin White
ATTORNEY May 23, 1961 W. A. HUBBARD 2,985,570
RAPID ION EXTRACTION MERCURY CELL
Filed Sept. 4, 1956 5 Sheets-Sheet 4
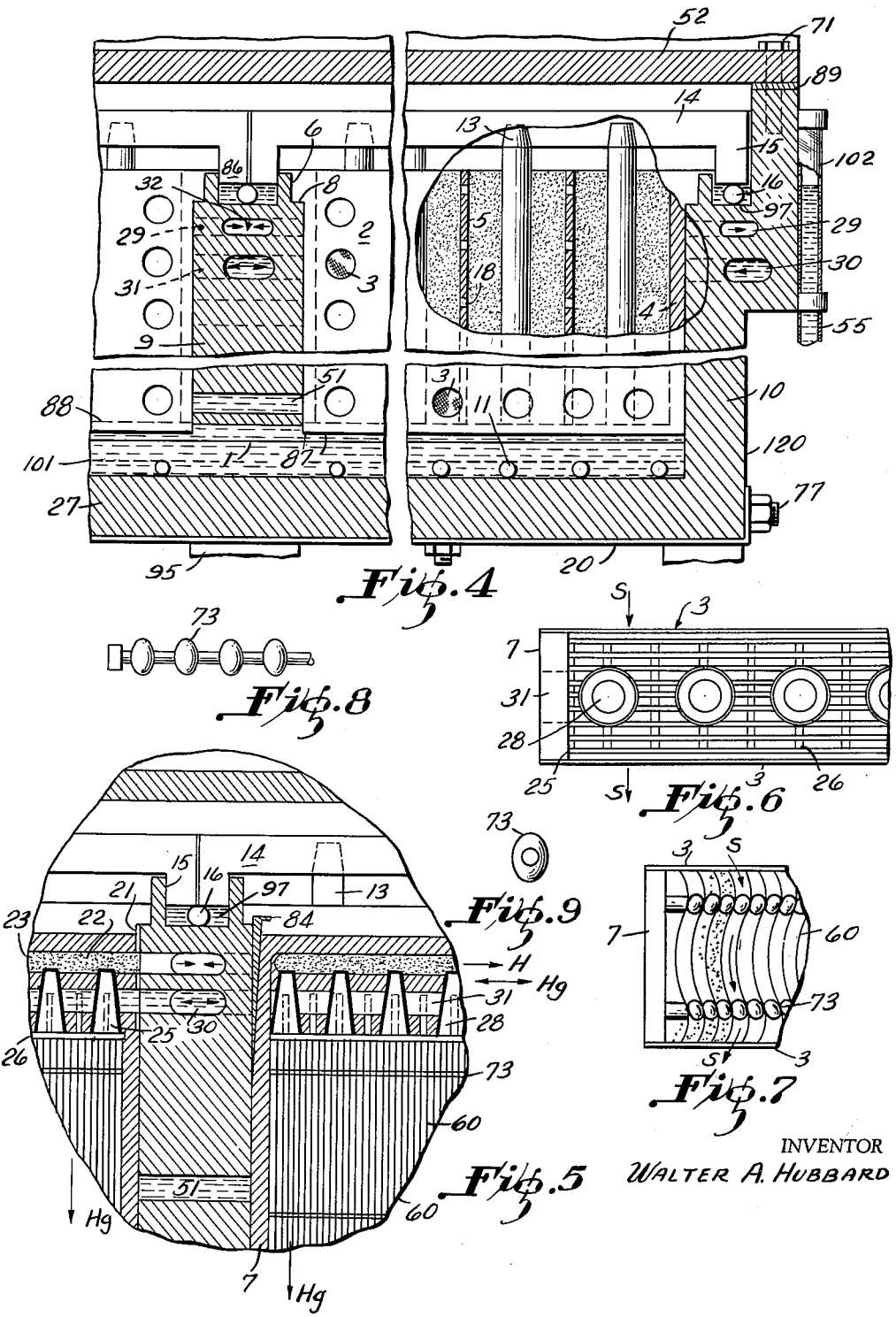
INVENTOR
WALTER A. HUBBARD

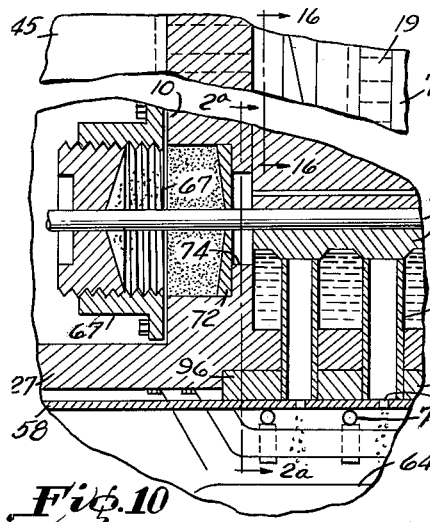

United States Patent Office 2,985,570
Patented May 23, 1961

2,985,570

RAPID ION EXTRACTION MERCURY CELL

Walter Allen Hubbard, 6008 Buell St.,
Bell Gardens, Calif.

Filed Sept. 4, 1956, Ser. No. 610,698

28 Claims. (Cl. 204—99)

The invention disclosed in this application, which is a continuation-in-part of my copending application Serial Number 511,857, entitled "Mercury-Cell and Method of Extraction," filed May 31, 1955, and now abandoned, relates generally to apparatus and methods for removing dissolved salts of metals from their electrolytic solutions, and more particularly has to do with rapid electrolysis of dissolved halogen salts such as sodium chloride, potassium bromide and the like from their aqueous solutions to form halogen gas and metal amalgam, by using mercury cathodes and anodes of unique design and function in a novel electrolytic cell characterized by its capacity for high throughputs operation and quantitative extractions from dilute solutions. The invention is especially directed to the provision of economical and useful methods and means for separating halogen salts of alkali metals from their relatively dilute brines such as sea water, which comprises an approximate 3.5% saline solution of which about two-thirds of its salt content consists of sodium chloride.

Conventional mercury cells used for separating alkali metal salts from concentrated brines are generally of the horizontal type in which a shallow pool of mercury serves as the cathode and supports a pool of electrolyte into which anodic graphite plates dip. The cells are made long and narrow to increase the active electrolytic zone formed between the mercury-electrolyte interface and the graphite plates, and electrolysis of the alkali metal cations and halogen anions proceeds rather slowly since these ions must migrate or diffuse over the relatively great distances between the mercury pool and graphite plates. Improvements in the design of such cells such as the incorporation of diaphragms have failed to realize any marked increase in the rate of electrolysis of concentrated saline solutions, and as a result the use of mercury cells for purifying dilute brines such as sea water on a large scale has been thought out of the question. Theoretical consideration of the quantities of mercury alone that would be required in such cells for extracting salts from large quantities of sea water demonstrate the economic impracticability of conventional mercury cell design for this use.

In contrast with the above, the present invention proceeds upon a radically new approach to mercury cell design and operation, characterized in that a dilute electrolytic solution is continuously and rapidly passed in such intimate contact promoting relation with the pervious anode and amalgamated cathode elements that the rate of electrolysis and degree of extractions are greatly enhanced to the end that economic operation of the cell upon dilute brines is made feasible. Whereas conventional cells depend almost entirely upon ion migrations and diffusion through relatively large distances between a single mercury-solution interface and one or more solid anodes to achieve solution electrolysis, the present novel cell operates by passing the electrolyte successively through many anodic and cathodic zones containing alternate porous or pervious anodes and cathodes in the direction of fluid flow so that the solution is in effect broken up or electrolytically "sieved" by the polarized cathodes and anodes for bringing the anions and cations in intimate closely spaced relation with the active electrolyzing regions associated with the electrodes.

Furthermore, the alternate anodic and cathodic zones are closely spaced yet insulated from one another to lower the cell electrical resistance so that large amperages effecting solution electrolysis may be realized without raising the applied voltages to values producing undesirable side reactions such as form hydrogen, alternate closely spaced porous anode and cathode frames of novel design being utilized to rapidly pass the electrolyte flow while confining the liberated gases inside the frames for upward discharge. Also, mercury is cycled through the cathode frames in the form of myriads of small particles having extended surface area and falling through the electrolytic solution and against the metal cathodes to promote rapid electrolysis of the metal ions and subsequent downward scavenging or scouring of the converted metal as amalgam for continuous removal from the solution at the cell base. Electrolyte substantially depleted of its ionic content flows from the cell to be constantly replaced by the influx of more electrolyte so that side reactions, resulting for example in hydrogen evolution, are minimized.

While the invention generally contemplates the electrolysis of solutions of metal salts to remove the metallic ion as metal amalgam, it finds particular application in the electrolysis of dilute brines containing halogen salts of alkali and alkaline earth metal, the economic purification of large throughputs of sea water being made feasible without excessive amounts of mercury being required inasmuch as the mercury is continuously recycled and re-used most efficiently in the cell. Amalgam removed from the cell may be concentrated and treated by conventional methods such as are utilized in the manufacture of caustic to separate the alkali metal as hydroxide from mercury amalgam the free mercury being then recycled to the cell. Enough excess mercury is used during cell operation to maintain the amalgam in a dilute free flowing condition for ready removal from the cell, as will be described.

For separation of the different alkali metals in pure amalgam form, the cells may be staged in series and operated at progressively higher voltages to electrolyze the nobler metals in the first stages and the baser elements in the later cells or stages with the specific amalgam for its processing.

These features and other objects of the invention, as well as the details of an illustrative embodiment, will be more fully understood from the following detailed description of the drawings, in which:

Fig. 1 is the front view of the cell; lower cutaway 1a is a vertical section taken on 1a—1a of Fig. 2; and upper cutaway 1b is a vertical section taken on line 1b—1b of Fig. 2;

Fig. 2 is left end-view of the cell; lower cutaway 2a is taken on lines 2a—2a of Figs. 1 and 10; upper cutaway 2b is a vertical section taken on line 2b—2b of Fig. 1;

Fig. 3 is a plan or top view of the cell with its cover, attached manifolds and mercury reservoir cover removed. Anode and cathode frames have been removed at the left of the figure to show the lower internal structure of the cell;

Fig. 4 is a vertical section taken on line 4—4 of Fig. 2 at the front of an anode cover. The cutaway in Fig. 4 shows anode structure surrounding graphite distributor rods.

Fig. 5 is an enlarged detail of cutaway 1a;

Fig. 6 is an internal view of the cathode frame with cathode elements removed, looking upward from its base;

Fig. 7 is a view similar to Fig. 6 showing spaced cathode elements locked in the frame;

Fig. 8 is a view of the locking device for the cathode elements;

Fig. 9 is an end view of the locking device;

Fig. 10 is an enlarged vertical section taken on lines 1a—1a of Figs. 2 and 11;

Fig. 11 is an enlarged view of cutaway 2a in Fig. 2;

Fig. 12 is a front view of the double under flow weir unit shown in broken lines in Fig. 11;

Fig. 13 is a detail of the raker shown in Fig. 10;

Fig. 14 is an end view of the weir shown in Fig. 12;

Fig. 15 is a front view of a gate valve shown in Fig. 3;

Fig. 16 is a vertical section taken thru the front wall of the cell on line 16—16 of Fig. 10;

Fig. 17 is a front view of the back-up board shown in broken lines within the cell in Fig. 2; and Fig. 18 is a fragmentary horizontal section through an anode assembly.

Referring generally to the overall construction of the box-like compartmented cell as shown in Figs. 1 through 4, it includes a case 120 with integral side, front and rear walls 10, 121 and 122 with a cover 52 and cover gasket 59 bolted to the case in air-tight relation, the cell parts unless otherwise specified, being made of chemically resistant, non-conductive material. Forward sloping floor 27 and spaced partitions 9 terminating above the floor complete the cell body which is divided into compartments or chambers between the partitions and end walls the chambers being in intercommunication below partitions 9 to allow free flow of the mercury pool on the floor. The cell size is rapidly increased by merely adding additional structure forming more side-by-side compartments.

Electrolyte S is delivered to a riser 12 at the rear of the cell compartments through valves 41 under the control of a float 42 in the riser and a counterbalance 85 to maintain the desired electrolyte level in the riser as seen through gauges 55 at the front and rear of the cell. Electrolyte flows forwardly in the cell chambers through the riser, through perforations 43 in rear wall 122 and then toward front wall 121. Spent electrolyte passes through the perforated back-up boards 19 in the front of the cell chambers into front risers 40, and then through perforations 108 in the gate valves 107 and through openings 100 in the front wall 121 for discharge through orifice 45, Figs. 15 and 16 showing the gate valve structure and the perforations mentioned.

Gate valves 107 ride up and down automatically against the inside of wall 121 under the control of floats 104 in the front risers, so that perforations 108 and 103 variably overlap to reduce the discharge of spent electrolyte as the level thereof drops in the risers and to increase electrolyte discharge when its level decreases. Sight windows 38 and 55 through which the mercury and electrolyte levels respectively may be viewed are useful as indicators from which it may be determined what adjustments should be made to floats 104 and 42 in order to realize the desired solution hydraulic gradient in the cell chamber from the rear to the front thereof and rate of flow through the cell frames.

Referring now more particularly to Figs. 3 through 5, each cell compartment is shown to contain upright alternate anode and cathode frames 4 and 7 respectively facing one another in closely spaced relation so that the eletcrolyte solution flows successively through the frames in a normal frontward direction. Removable mating wedges 44 inserted between back-up boards 19 at the front of each compartment and the front wall 121 act to push the frames together for efficient electrolysis of solution passing therethrough. Alternate cathode frames are gasketed at 21 and oppositely wedged laterally against the partitions 9 and/or end walls 10 by removable side wedges 84 illustrated in Fig. 5.

Each anode frame shown in detail in Fig. 4 and in Fig. 18 includes laterally spaced upright sections 5 containing openings 18 and upright graphite rods 13 spaced between the sections 5, with loose graphite filling the spaces between the rods and sections and also the notches to form a homogeneous, yet highly pervious graphite anode of very great effective surface area. Anode frames 4 include ears 6 resting on the ledges 8 in the cell partitions 9 and end walls 10 holding the anode bottoms above the level 1 of the mercury pool on the cell bottom 27.

Electric current is conducted to the graphite rods 13 through transverse bus bars 14 threaded or otherwise secured to the rods 13. Current is conducted to bars 14 from exterior bus bar 17 seen in Fig. 3 to the distributor bars 16 running forwardly in the troughs 15 in the partitions and end walls of the cell containing pools of conductive fluid 97 such as mercury into which the transverse bus bars dip at horns 86. A suitable protective fluid such as asphaltum covers fluid 97 in the troughs.

Opposite sides or faces of each anode frame are covered by highly pervious, chemically resistant insulating material such as glass cloth 200 in order to retain the graphite granules in the frame and also act as an insulator, yet remaining pervious or sieve-like for the passage of electrolyte through the anode and to retain liberated gases for ascension through the frames. In addition, thin spacers or covers 2 suitably formed of plastic material are superimposed on the glass cloth to space the anode from its adjacent cathode, the spacers being perforated to permit passage of electrolyte therethrough. Covers 2 are also secondary insulation.

Halogen gases such as chlorine, bromine and iodine vapors forming within the anode frame as a result of solution electrolysis at the graphite-solution interfaces rise through the anode frames and their open tops to collect under the cell cover, from which location the gases are drawn off through manifold 53 under suction, as seen in Fig. 2. Warm gas is injected into the cell through manifold 54 to heat and blow liberated gases toward suction manifold 53 and to compensate for the withdrawn halogen gas, maintaining suitable pressure within the cell for special operations.

In Figs. 1 and 5 is seen a cathode frame 7 generally rectangular in shape and having open bottom 101 dipping into the mercury pool and standing on the current distributor bars 11 in the mercury, and a closed top. Each frame contains vertically elongated spaced parallel strips of conducting metal, amalgamated and secured together to form metal cathode elements 60 typically of copper, and inserted into the frames to pass electrolyte therethrough. The narrowly spaced cathode elements extend in parallel undulating relation as seen in Fig. 7 to break-up or deflect the horizontal flow of electrolyte between the front of the elements so that the solution scours their sides removing accumulated amalgam into the spaces, for the purposes to be described. The elements 60 also support the frame and rest on submerged conductor bars 11 on the cell floor 27. The elements are locked in position by the ellipsoidal spacers 73 mounted on the parallel rods shown in Figs. 7 and 8 capable of insertion through slots in the elements for turning movement locking the spacers between the elements and rigidly holding the assembly together.

Opposite sides of the frame are covered with inert, porous, and insulating fabric such as glass cloth 3 for insulation and also to confine mercury particles dropping between the spaces between elements 60, for readily passing the electrolyte through the cathode zones.

Freely flowing mercury moving with velocity acquired in descending from reservoir is delivered to the top of each cathode frame successively through the flow meter 34 seen in Fig. 2, reservoir 35, drain duct 36, feed regulator valve 37, feeder ducts 30 in the cell walls and cell dividing members 9 as seen in Figs. 2 through 5, feed laterals 31 in these same walls, feed laterals 24 in the top portions of the cathode frames, and vertical feeder slots 25 in the frames from which the mercury spills over the horizontal frame serrations 26 as seen in Figs. 5 and 6. The latter act to break-up the falling mercury into thin, spread out, high velocity streams or sheets, falling against the tops of the cathode elements and streaming downward against the element sides and also falling within the spaces therebetween as tiny droplets or "mercury rain." As a result, the mercury passes downward through the electrolyte in a cathodic condition with maximum exposed surface area for promoting electrolysis of the solution ions which are themselves brought into proximate relation to the mercury particles by the flow of electrolyte through the cathodes. Therefore, the solution cations need travel only a very short distance to form amalgam with the polarized mercury rain, the mercury additionally acting to scour the already formed amalgam particles deflected into the spaces between the cathode elements by deflection of the flowing electrolyte in these spaces. The streaming mercury cathode provides for greatly increased cathode surface area, the descending mercury making innumerable contacts with the strip surfaces and scouring and re-amalgamating the surfaces, to flow finally out the bottoms of the frames carrying out the collected metallic ion in amalgam form. No clogging action can occur, and the mercury always tends to fall downward gathering momentum. Thus the cell may acquire very great effective electrode area and yet occupy a very small floor space.

Mercury and amalgam fall through the open bottoms of the cathode frames into the mercury pool on the cell floor 27 the pool serving as additional cathode surface area supplementing the upright cathodes. Current flowing into the electrolyte from the anodes travels to the cathode elements dipping into the mercury pool and then to the distributor bars 11 on the cell floor to be conducted to the exterior into bus bars 20 via terminal studs 77.

Any hydrogen formed in the cathode frames escapes upward through the escape vents 28 and then laterally through ducts 22 in the frame loosely stuffed with glass wool packing 23 to laterals 29 in the cell dividing members and ducts 32 for discharge through manifold 33 outside the cell, as seen in Figs. 1 and 2. A gasket 21 shown in Fig. 5 seals the frame against the cell dividing members and/or end walls to prevent escape of mercury flowing through laterals 21 and 24 and also to prevent escape of gas glowing from the cell members to their discharge ducts. Cathode wedges 84 enforce this seal.

Referring now to Figs. 2, 10 and 11 the level of the mercury pool standing on the sloping cell floor 27 is controlled by an overflow weir 47 at the front of the cell within weir chamber 65 formed by the extension of the end wall near the well bottom and the floor together with front plate 66 and cover 79. Mercury escapes from the cell by flowing under weir tips 48 and 50 of unit 80 located below front wall at 91 which is raised above the mercury level, and spillage over the weir is removed through discharge orifice 39.

Amalgam scum and impurities floating on the mercury pool are prevented from flowing to the overflow weir 47 by double underflow weir 80 located beneath forward wall 121 and having lower edges 48 and 50 dipping into the pool below scum level. Underflow weir plate 94 bolts to the forward cell wall 121 forming the rear of chamber 65.

Scum entering the trap 81 between the two weir edges 48 and 50 through horizontal slots 83 which are located at or slightly above the surface of the mercury pool in the upstream weir 48 is automatically removed by slowly moving raker shaft 62 mounting spaced rakers 63 fitting within the trap. The shaft extends in weir guide 82 and laterally outward from the cell through orifice 84 in wall 10 as seen in Fig. 10, and also through packing gland 67 and reducing washer 72 to a cross head 130 reciprocated by link 57 driven by motor 56. The raker blocks 63 skim the amalgam scum over and into the vertical drain ducts 59 in the cell floor 27, from which the scum is released by horizontal displacement of the gate valve 58 spring urged upwardly at 70 against bearing flange 69 under the floor. The valve 58 is also reciprocated by the cross head 130 to discharge scum from ducts 59 through gates 75 when the latter are covered by the raker blocks. Scum falls into sump pan 64 for removal and concentration as by centrifugal separation of the mercury and electrolyte.

All of the mercury may be regenerated from the amalgam or other sources by conventional methods such as are used in the manufacture of caustic, and all of the mercury removed from the cell or otherwise separated from the amalgam may be recycled to the cell for economy. Therefore no mercury is lost and the capacity of the cell is limited only by the electrode areas and the rates at which mercury and electrolyte can be run through the cell comparable with electrolysis principles. Since the electrode areas have been greatly increased and electrolyte flow speeded up, the cell capacity and operation are significantly improved for through-put extractions with better control over selectivity and economical use of energy even on very dilute electrolytes.

As pointed out in the introduction several cells may be staged in series and operated at different electrical potentials to perform or achieve separate selective and quantitative electrolytic separations of different metal forming ions that form amalgam. Thus, increasing the potentials in successive cells permits consecutive removal of progressingly active metals as amalgam and selective removal of progressively more basic cations in the form of specific amalgams.

The cell will provide industry with a superior and unrivaled tool for use in electrolytic extractions and separations, while at the same time providing in the case of halogen or gas forming anodic products an additional end product comprising usable water instead of wasting water in an undesirably impure ion contaminated form.

In fact this new type of mercury cell is designed to make possible the utilization of dilute solutions, particularly brines like sea water on a large scale, and in doing so provides a mercury cathode electrolytic cell that can produce chemicals, and metal amalgams, from which metals may be derived, and simultaneously convert such raw source material as sea water into fresh water on a large scale. This latter effect is peculiar and unique to this new mercury cell only, and its value if weighed on this effect alone could easily out weigh all other advantages, when one considers the importance of water supply to industry, irrigation districts and large cities near such unlimited, raw source material. And the end product, fresh water, is relatively cost free as a result of the salable value of extracted minerals.

I claim:

1. The process of removing dissolved halogen salts of metals from their electrolytic solutions, including flowing all the salt solution in a single stream directly through a series succession of alternate and discrete cathodic and anodic zones to which electric current is supplied and through electrically insulative zones between successive cathodic and anodic zones and controlling said flow so that the solution anions and cations are rapidly carried by the flow into the cathodic and anodic zone interiors for rapid electrolytic discharge therein, maintaining close and substantially uniform spacing between adjacent cathodic and anodic zones, finely straining the solution flowing throughout each of said insulative zones, dropping mercury only through and within said cathodic zones between pairs of insulative zones and independently of said anodic zones to discharge and remove cations from the flowing solution as amalgam, and removing discharged anions from said anodic zones entirely independently of and in spaced relation to said cathodic zones.

2. The process of removing dissolved halogen salts of alkali metals from their aqueous solutions, including flowing all the salt solution in a single stream directly through a series succession of substantially parallel alternate and discrete cathodic and anodic zones to which electric current is supplied and through electrically insulative zones between successive cathodic and anodic zones and controlling said flow so that the solution anions and cations are rapidly carried by the flow into the cathodic and anodic zone interiors for rapid electrolytic discharge therein forming free halogen and amalgam, maintaining close and substantially uniform spacing between adjacent cathodic and anodic zones, finely straining the solution flowing throughout each of said insulative zones, dropping mercury only through and within said cathodic zones between pairs of insulative zones and independently of said anodic zones to discharge and remove cations as amalgam, and removing said free halogen from said anodic zones entirely independently of and in spaced relation to said cathodic zones.

3. The process for removing dissolved halogen salts of alkali metals from their aqueous solutions, including flowing all the salt solution in a single stream substantially horizontally directly through a series succession of upright relatively closely spaced alternate and discrete cathodic and anodic zones to which electric current is supplied and through electrically insulative zones between successive cathodic and anodic zones and controlling said flow so that the solution anions and cations are rapidly carried by the flow into the cathodic and anodic zone interiors for rapid electrolytic discharge therein forming free halogen and amalgam, maintaining close and substantially uniform spacing between adjacent cathodic and anodic zones, finely straining the solution flowing throughout each of said insulative zones, dropping finely divided mercury downward only through and within said cathodic zones between pairs of insulative zones and independently of said anodic zones and into intimate contact with discharged cations to remove the cations from said cathodic zones as amalgam, and removing said free halogen from said anodic zones entirely independently of and in spaced relation to said cathodic zones.

4. The process for removing dissolved halogen salts of alkali metals from their aqueous solutions, including flowing the salt solution substantially horizontally directly through a series succession of upright relatively closely spaced and insulated alternate and discrete cathodic and anodic zones to which electric current is supplied and through electrically insulative zones between successive cathodic and anodic zones and controlling said flow so that the solution anions and cations are rapidly carried by the flow into the cathodic and anodic zone interiors for rapid electrolytic discharge therein forming free halogen and amalgam, maintaining close and substantially uniform spacing between adjacent cathodic and anodic zones, finely straining the solution flowing throughout each of said insulative zones, dropping finely divided mercury downward only through and within said cathodic zones between pairs of insulative zones and independently of said anodic zones and into intimate contact with solution cations to discharge and remove the cations from said cathodic zones as amalgam, removing said amalgam from beneath said zones and solution passing therethrough and removing said free halogen from said anodic zones entirely independently of and in spaced relation to said cathodic zones.

5. The process for removing dissolved halogen salts of alkali metals from their aqueous solutions, including flowing the salt solution substantially horizontally directly through a series succession of upright relatively closely spaced and insulated alternate and discrete cathodic and anodic zones to which electric current is supplied and through electrically insulative zones between successive cathodic and anodic zones and controlling said flow so that the solution anions and cations are rapidly carried by the flow into the cathodic and anodic zone interiors for rapid electrolytic discharge therein forming free halogen and amalgam, maintaining the voltage applied to said zones in excess of the salt decomposition voltage, maintaining close and substantially uniform spacing between adjacent cathodic and anodic zones, finely straining the solution flowing throughout each of said insulative zones, dropping finely divided mercury downward only through and within said cathodic zones between pairs of insulative zones and independently of said anodic zones and into intimate contact with solution cations to discharge and remove the cations from cathodic zones as amalgam, removing said amalgam from beneath said zones and solution passing therethrough, and removing said free halogen from said anodic zones entirely independently of and in spaced relation to said cathodic zones.

6. The process for removing dissolved halogen salts of alkali metals from their aqueous solutions including sea water to produce halogen salt free water, including flowing the salt solution substantially horizontally directly through a series succession of upright relatively closely spaced and insulated alternate and discrete cathodic and anodic zones to which electric current is supplied and through electrically insulative zones and controlling said flow between successive cathodic and anodic zones so that the solution anions and cations are rapidly carried by the flow into the cathodic and anodic zone interiors for rapid electrolytic discharge therein forming free halogen and amalgam, maintaining close and substantially uniform spacing between adjacent cathodic and anodic zones, finely straining the solution flowing throughout each of said insulative zones, freely dropping finely divided mercury downwardly only through and within said cathodic zones between pairs of insulative zones and independently of said anodic zones and into intimate contact with solution cations to discharge and remove the cations from said cathodic zones as amalgam, deflecting the solution as it flows through said cathodic zones to displace the mercury in the direction of solution flow, and removing said free halogen from said anodic zones entirely independently of and in spaced relation to said cathodic zones.

7. The process for removing dissolved halogen salts of alkali metals from their aqueous solutions, including flowing the salt solution directly through first and second groups of alternate and discrete cathodic and anodic zones arranged in succession and to which electric current is supplied at selected different voltages as between said groups and flowing the solution through electrically insulative zones between successive cathodic and anodic zones and controlling said flow so that the solution anions and cations are rapidly carried by the flow into the cathodic and anodic zone interiors for rapid electrolytic discharge therein forming free halogen and different metal amalgams within different zone groups, maintaining close and substantially uniform spacing between adjacent cathodic and anodic zones, finely straining the solution flowing throughout each of said insulative zones, dropping mercury only through and within said cathodic zones between pairs of insulative zones and independently of said anodic zones to remove discharged cations as amalgam, and removing said free halogen from said anodic zones entirely independently of and in spaced relation to said cathodic zones.

8. Apparatus for removing dissolved metal salt from its electrolytic solution, comprising an electrolytic cell containing a succession of and alternating cathodes and anodes contained in zones extending in series relation within the cell having an inlet and outlet adapted to flow the solution serially directly through said cathodes and anodes, said cathodes and anodes including porous alternate cathodic and anodic electrodes in said zones through the interior of which the solution cations and anions are adapted to be rapidly carried by said flow, said electrodes being operable to rapidly electrolytically discharge said ions, means for supplying electric current to said electrodes, and mercury dropping through said cathode zones only and adapted to remove the discharged metal ion from the solution as amalgam, said mercury contacting the cathodic electrodes.

9. Apparatus for removing a dissolved halogen salt of an alkali metal from its aqueous solution, comprising an electrolytic cell containing a succession of alternating cathodes and anodes contained in upright zones extending in face to face stacked series relation with the cell having an inlet and outlet adapted to flow the solution serially directly through said cathodes and anodes, said cathodes and anodes including porous alternate cathodic and anodic electrodes in said zones through the interiors of which the solution cations and anions are adapted to be rapidly carried by said flow, said electrodes being operable to rapidly electrolytically discharge said ions whereby forming free halogen in said anode zones, means for supplying electric current to said electrodes, and mercury dropping through said cathode zones only and adapted to remove the discharged metal ion from the solution as amalgam, said mercury contacting the cathodic electrodes.

10. The invention as defined in claim 9 including a pool of mercury beneath said upright zones supporting said flowing solution.

11. The invention as defined in claim 10 comprising parallel frames in the cell forming said zones and supporting said electrodes.

12. The invention as defined in claim 11 comprising thin, finely and highly porous insulation separating the anode and cathode frames.

13. The invention as defined in claim 12 comprising graphite anodes and amalgamated metallic cathodes.

14. The invention as defined in claim 13 comprising upright metallic cathode strips spaced in said cathode frames to pass the solution therebetween.

15. The invention as defined in claim 14 in which said strips are angled to deflect the passing solution for carrying the formed amalgam into the passages between the strips.

16. The invention as defined in claim 13 comprising mercury particles falling against said cathodes for intimate contact with the solution cations.

17. Apparatus for removing a dissolved halogen salt of an alkali metal from its aqueous solution, comprising an electrolytic cell forming intercommunicating laterally spaced chambers and having an inlet and outlet simultaneously adapted to flow the solution laterally directly through each of said chambers, parallel upright frames extending in lateral planes and in longitudinally closely spaced face-to-face stacked series relation in each of said chambers, porous cathodic and anodic electrodes supported by the frames and through the interiors of which zones the solution cations and anions are adapted to be rapidly carried by said flow, said electrodes being operable to rapidly electrolytically discharge said ions thereby forming free halogen in the anode frames, means for supplying electric current to said electrodes, mercury dropping downwardly through said cathode frames independently of the anode frames for discharging and removing the discharged metal ion from the solution as amalgam, and means to control removal of mercury and amalgam from the bottom of the cell to the exterior thereof.

18. The invention as defined in claim 17 in which said cathodic electrodes form winding passages for directing the solution in a winding course of flow.

19. The invention as defined in claim 17 including a riser at the rear of the cell flowing said solution to all of said chambers.

20. The invention as defined in claim 17 including duct means conducting said gas to the cell exterior.

21. The invention as defined in claim 17 including a gate valve controlling flow of said solution through the cell.

22. The invention as defined in claim 17 including a sloping cell floor and a weir system controlling drainage of said mercury and amalgam from said floor under the solution in the cell.

23. The invention as defined in claim 22 comprising under and over flow weirs respectively trapping impurities floating on the mercury and controlling the level of mercury standing on the floor, an automatic skimmer removing said trapped impurities from beneath the solution during cell operation, and drain ducts in the cell bottom operable to passed trapped impurities.

24. The invention as defined in claim 17 including ports formed by the cathode frame passing hydrogen produced by electrolysis of water for removal from the frame to the cell exterior, said mercury being supplied to the cell free from contact by liberated gases within the cell.

25. The invention as defined in claim 17 comprising troughs containing mercury to which said current is supplied and into which portions of said anode frames dip.

26. The invention as defined in claim 17 including glass fabric frame covers and thin, pervious substantially rigid spacers compressed by and between successive frames thereby establishing with said covers a predetermined gap between successive anodic and cathodic electrodes.

27. The invention as defined in claim 26 including rigid spacers in said anode frames and graphite particles packed therein between said anode frame spacers.

28. The invention as defined in claim 26 including rigid perforate means urging said frames and rigid spacers therebetween into tightly compressed together condition and passing said electrolyte through said perforations.

References Cited in the file of this patent

UNITED STATES PATENTS

| | | |
|---|---|---|
| 2,093,770 | Billiter | Sept. 21, 1937 |
| 2,598,228 | Cox | May 27, 1952 |
| 2,669,542 | Dooley | Feb. 16, 1954 |
| 2,733,202 | Boyer | Jan. 31, 1956 |
| 2,762,765 | Kircher | Sept. 11, 1956 |
| 2,829,096 | Clement | Apr. 1, 1958 |